United States Patent
Nefcy et al.

(10) Patent No.: US 9,358,890 B2
(45) Date of Patent: Jun. 7, 2016

(54) HYBRID VEHICLE BRAKING SYSTEM AND METHOD

(71) Applicant: FORD GLOBAL TECHNOLOGIES, LLC, Dearborn, MI (US)

(72) Inventors: Bernard D. Nefcy, Novi, MI (US); Francis Thomas Connolly, Ann Arbor, MI (US); Daniel Scott Colvin, Farmington Hills, MI (US); Zhengyu Dai, Canton, MI (US); Ming Lang Kuang, Canton, MI (US); Xiaoyong Wang, Novi, MI (US); Yanan Zhao, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 83 days.

(21) Appl. No.: 14/157,940

(22) Filed: Jan. 17, 2014

(65) Prior Publication Data

US 2015/0202964 A1 Jul. 23, 2015

(51) Int. Cl.
| | |
|---|---|
| B60L 7/18 | (2006.01) |
| B60W 10/08 | (2006.01) |
| B60W 10/188 | (2012.01) |
| B60W 10/192 | (2012.01) |
| B60K 6/48 | (2007.10) |
| B60W 30/18 | (2012.01) |
| B60L 7/26 | (2006.01) |

(52) U.S. Cl.
CPC ... *B60L 7/18* (2013.01); *B60K 6/48* (2013.01); *B60L 7/26* (2013.01); *B60W 10/08* (2013.01); *B60W 10/188* (2013.01); *B60W 10/192* (2013.01); *B60W 30/18127* (2013.01); *B60Y 2300/89* (2013.01); *Y02T 10/6221* (2013.01)

(58) Field of Classification Search
CPC ...... B60L 7/10; B60L 7/18; B60W 30/18127; B60Y 2300/89
USPC ....................................................... 701/70–98
See application file for complete search history.

(56) References Cited

U.S. PATENT DOCUMENTS

| | | | | |
|---|---|---|---|---|
| 4,270,806 | A | * | 6/1981 | Venkataperumal ... B60T 13/589 188/159 |
| 5,318,355 | A | * | 6/1994 | Asanuma ................ B60L 3/108 180/165 |
| 5,716,108 | A | * | 2/1998 | Asa ......................... B60T 7/042 188/156 |
| 6,086,166 | A | * | 7/2000 | Fukasawa ............. B60L 3/0023 303/122.04 |
| 6,811,229 | B2 | * | 11/2004 | Soga ....................... B60K 6/44 188/156 |
| 6,862,511 | B1 | | 3/2005 | Phillips et al. |
| 8,145,397 | B2 | | 3/2012 | Heap et al. |
| 8,321,100 | B2 | | 11/2012 | Heap |
| 8,560,144 | B2 | | 10/2013 | McGrogan |
| 8,594,867 | B2 | | 11/2013 | Heap et al. |
| 9,017,214 | B2 | * | 4/2015 | Murakami ............... B60K 6/48 477/5 |

(Continued)

*Primary Examiner* — Thomas Tarcza
*Assistant Examiner* — Tyler J Lee
(74) *Attorney, Agent, or Firm* — David B. Kelley; Brooks Kushman P.C.

(57) ABSTRACT

A vehicle includes a powertrain having an electric machine, and friction brakes configured to resist rotation of a vehicle wheel. The further includes at least one controller programmed to (i) issue a command for the electric machine to apply a regenerative torque to decelerate the vehicle in response to driver braking demand, and (ii) cause both a decay in the regenerative torque and a countervailing increase in the resistance of the friction brakes when vehicle speed is reduced to less than a first threshold such that braking demand is substantially satisfied by only the friction brakes when the vehicle speed is less than a second threshold.

16 Claims, 3 Drawing Sheets

(56) References Cited

U.S. PATENT DOCUMENTS

| | | | |
|---|---|---|---|
| 2003/0184152 A1* | 10/2003 | Cikanek | B60K 6/48 303/152 |
| 2004/0162187 A1* | 8/2004 | Suzuki | B60K 6/44 477/182 |
| 2009/0157245 A1 | 6/2009 | Moon et al. | |
| 2011/0278913 A1* | 11/2011 | Kim | B60T 1/10 303/3 |
| 2013/0076113 A1* | 3/2013 | Pihl | B60T 13/586 303/3 |
| 2013/0080038 A1 | 3/2013 | Zhou et al. | |
| 2014/0200111 A1* | 7/2014 | Murakami | B60K 6/48 477/4 |

* cited by examiner

HYBRID VEHICLE BRAKING SYSTEM AND METHOD

TECHNICAL FIELD

This disclosure relates to hybrid powertrain control systems. More specifically, the disclosure relates to regenerative braking controls.

BACKGROUND

Vehicles having automatic transmissions may be equipped with a torque converter providing a fluid coupling between the powertrain load and the power source. The fluidic coupling is usually such that it allows torque from the power source to be decoupled from wheels at low speeds. While useful to manage differing torques and/or speeds of the power source and load, efficiency losses are incurred related to the differences in speeds.

Hybrid vehicles may employ one or more electric machines having a motor-generator combination in combination with an internal combustion engine. Depending on vehicle operating conditions, an electric machine may selectively alternate between serving as a power source or a load upon the powertrain. The timing of this alternate operation of the electric machine may serve to optimize fuel economy.

SUMMARY

In at least one embodiment, a vehicle includes a powertrain having an electric machine and friction brakes configured to resist rotation of a vehicle wheel. The further includes at least one controller programmed to (i) issue a command for the electric machine to apply a regenerative torque to decelerate the vehicle in response to driver braking demand, and (ii) cause both a decay in the regenerative torque and a countervailing increase in the resistance of the friction brakes when vehicle speed is reduced to less than a first threshold such that braking demand is substantially satisfied by only the friction brakes when the vehicle speed is less than a second threshold.

In at least one embodiment, a method of controlling deceleration of a vehicle having an electric machine includes applying a regenerative torque from the electric machine to a powertrain torque output to satisfy a driver braking demand, and decoupling the powertrain output torque from a vehicle axle when vehicle speed is reduced to less than a first predetermined threshold. The method further includes decaying the regenerative torque such that a magnitude of the regenerative torque is approximately zero when the powertrain output torque is decoupled, and increasing a friction brake resistance at wheels of the vehicle such that driver braking demand is satisfied by only the friction brakes when the regenerative torque is approximately zero.

In at least one embodiment, a vehicle includes an electric machine configured to apply regenerative torque during a regenerative braking mode and friction brakes configured to apply resistance to rotation of vehicle wheels. The vehicle further includes a controller programmed to transition out of regenerative braking mode prior to a decoupling of the electric machine from the wheels such that during the transition, the regenerative torque and friction brake resistance collectively satisfy braking demand and after the transition, regenerative torque is approximately zero.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
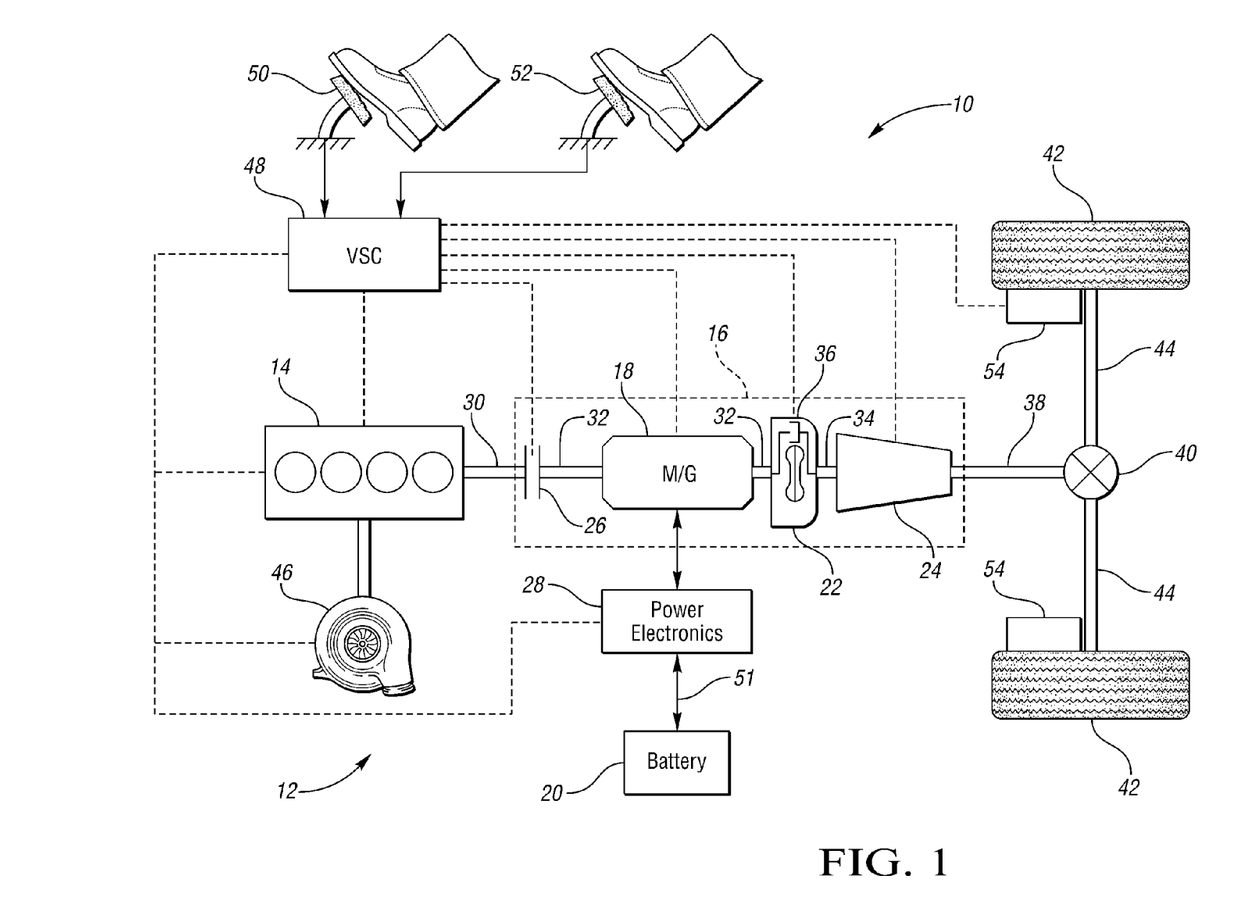
FIG. 1 is a schematic of a hybrid electric vehicle.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The vehicle 10 includes a powertrain 12. The powertrain 12 includes an engine 14 that drives a transmission 16. As will be described in further detail below, the transmission 16 includes an electric machine such as an electric motor/generator (M/G) 18, an associated traction battery 20, a torque converter 22, and a multiple step-ratio automatic transmission, or gearbox 24.

The engine 14 and the M/G 18 are both capable of providing motive power for the HEV 10. The engine 14 generally represents a power source which may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics 28 condition direct current (DC) power provided by the battery 20 to the requirements of the M/G 18, as will be described below. For example, power electronics may provide three phase alternating current (AC) to the M/G 18.

The engine 14 may additionally be coupled to a turbocharger 46 to provide an air intake pressure increase, or "boost" to force a higher volume of air into a combustion chamber of the engine 14. Related to the increased air pressure provided to the engine 14 by the turbocharger 46, a corresponding increase in the rate of fuel combustion may be achieved. The additional air pressure boost therefore allows the engine 14 to achieve additional output power, thereby increasing engine torque.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 38 and the transmission input shaft 34. The gearbox 24 ultimately provides a powertrain output torque to output shaft 38.

As further shown in the representative embodiment of FIG. 1, the output shaft 38 is connected to a differential 40. The differential 40 drives a pair of wheels 42 via respective axles 44 connected to the differential 40. The differential transmits torque allocated to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The vehicle 10 further includes a foundation brake system 54. The system may comprise friction brakes suitable to selectively apply pressure by way of stationary pads attached to a rotor affixed to the wheels. The applied pressure between the pads and rotors creates friction to resist rotation of the vehicle wheels 42, and is thereby capable of slowing the speed of vehicle 10.

When the disconnect clutch 26 is at least partially engaged, power flow from the engine 14 to the M/G 18 or from the M/G 18 to the engine 14 is possible. For example, when the disconnect clutch 26 is engaged, the M/G 18 may operate as a generator to convert rotational energy provided by a crankshaft 30 through M/G shaft 32 into electrical energy to be stored in the battery 20. As discussed in more detail below, the rotational resistance imparted on the shaft through regeneration of energy may be used as a brake to decelerate the vehicle. The disconnect clutch 26 can also be disengaged to decouple the engine 14 from the remainder of the powertrain 12 such that the M/G 18 can operate as the sole drive source for the vehicle 10.

Operation states of the powertrain 12 may be dictated by at least one controller. While illustrated by way of example as a single controller, such as a vehicle system controller (VSC) 48, there may be a larger control system including several controllers. The individual controllers, or the control system, may be influenced by various other controllers throughout the vehicle 10. Examples controllers that may be included within representation of the VSC 48 include a transmission control module (TCM), brake system control module (BSCM), a high voltage battery energy control module (BECM), as well as other controllers in communication which are responsible for various vehicle functions. The at least one controller can collectively be referred to as a "controller" that commands various actuators in response to signals from various sensors. The VSC 48 response may serve to dictate or influence a number of vehicle functions such as starting/stopping engine 14, operating the M/G 18 to provide wheel torque or recharge the traction battery 20, select or schedule transmission gear shifts, etc. The VSC 48 may further include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The VSC 48 communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, the VSC 48 may communicate signals to and/or from the engine 14, the turbocharger 46, the disconnect clutch 26, the M/G 18, the transmission gearbox 24, torque converter 22, the torque converter bypass clutch 36, and the power electronics 28. Although not explicitly illustrated, those of ordinary skill in the art will recognize various functions or components that may be controlled by the VSC 48 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for disconnect clutch 26, torque converter bypass clutch 36, and transmission gearbox 24, and the like. Sensors communicating input through the I/O interface may be used to indicate turbocharger boost pressure, turbocharger rotation speed, crankshaft position, engine rotational speed (RPM), wheel speeds, vehicle speed, engine coolant temperature, intake manifold pressure, accelerator pedal position, ignition switch position, throttle valve position, air temperature, exhaust gas oxygen or other exhaust gas component concentration or presence, intake air flow, transmission gear, ratio, or mode, transmission oil temperature, transmission turbine speed, torque converter bypass clutch status, deceleration, or shift mode, for example.

The VSC 48 also includes a torque control logic feature. The VSC 48 is capable of interpreting driver requests based on several vehicle inputs. These inputs may include, for example, gear selection (PRNDL), accelerator pedal inputs, brake pedal input, battery temperature, voltage, current, and battery state of charge (SOC). The VSC 48 in turn may issue command signals to the transmission to control the operation of the M/G 18.

The M/G 18 is also in connection with the torque converter 22 via shaft 32. Therefore the torque converter 22 is also connected to the engine 14 when the disconnect clutch 26 is at least partially engaged. The torque converter 22 includes an impeller fixed to the M/G shaft 32 and a turbine fixed to a transmission input shaft 34. The torque converter 22 provides a hydraulic coupling between shaft 32 and transmission input shaft 34. An internal bypass clutch 36 may also be provided torque converter such that, when engaged, clutch 36 frictionally or mechanically couples the impeller and the turbine of the torque converter 22, permitting more efficient power transfer. The torque converter bypass clutch 36 may be operated as a launch clutch to provide smooth vehicle launch. In contrast, when the bypass clutch 36 is disengaged, the M/G 18 may be decoupled from the differential 40 and the vehicle axles 44. For example, during deceleration the bypass clutch 36 may disengage at low vehicle speeds, providing a torque bypass, to allow the engine to idle and deliver little or no output torque to drive the wheels.

A driver of the vehicle 10 may provide input at accelerator pedal 50 and create a demanded torque, power, or drive command to propel the vehicle 10. In general, depressing and releasing the pedal 50 generates an accelerator input signal that may be interpreted by the VSC 48 as a demand for increased power or decreased power, respectively. Based at least upon input from the pedal, the controller 48 may allocate torque commands between each of the engine 14 and/or the M/G 18 to satisfy the vehicle torque output demanded by the driver. The controller 48 may also control the timing of gear shifts within the gearbox 24, as well as engagement or disengagement of the disconnect clutch 26 and the torque converter bypass clutch 36. Like the disconnect clutch 26, the torque converter bypass clutch 36 can be modulated across a range between the engaged and disengaged positions. This may produce a variable slip in the torque converter 22 in addition to the variable slip produced by the hydrodynamic coupling between the impeller and the turbine. Alternatively, the torque converter bypass clutch 36 may be operated as either locked or open without using a modulated operating mode depending on the particular application.

The driver of vehicle 10 may additionally provide input at brake pedal 52 to create a vehicle braking demand. Depressing brake pedal 52 generates a braking input signal that is interpreted by controller 48 as a command to decelerate the vehicle. The controller 48 may in turn issue commands to cause the application of negative torque to the powertrain output shaft. Additionally or in combination, the controller may issue commands to activate the brake system 54 to apply friction brake resistance to inhibit rotation of the vehicle wheels 42. The negative torque values provided by both of the powertrain and the friction brakes may be allocated to vary the amount by which each satisfies driver braking demand.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional powered torque to turn the shaft 32. This operation mode may be referred to as a "hybrid mode." As mentioned above, the VSC 48 may be further operable to issue commands to allocate a torque output of both the engine 14 and the M/G 18 such that the combination of both torque outputs satisfies an accelerator 50 input from the driver.

To drive the vehicle 10 with the M/G 18 as the sole power source, the power flow remains the same except the disconnect clutch 26 isolates the engine 14 from the remainder of the powertrain 12. Combustion in the engine 14 may be disabled or otherwise OFF during this time in order to conserve fuel, for example. The traction battery 20 transmits stored electrical energy through wiring 51 to power electronics 28 that may include an inverter. The power electronics 28 convert high-voltage direct current from the battery 20 into alternating current for use by the M/G 18. The VSC 48 may further issue commands to the power electronics 28 such that the M/G 18 is enabled to provide positive or negative torque to the shaft 32. This operation where the M/G 18 is the sole motive source may be referred to as an "electric only" operation mode.

Additionally, the M/G 18 may operate as a generator to convert kinetic energy from the powertrain 12 into electric energy to be stored in the battery 20. The M/G 18 may act as a generator while the engine 14 is providing the sole propulsion power for the vehicle 10, for example. The M/G 18 may additionally act as a generator during times of regenerative braking in which rotational energy from spinning the output shaft 38 is transferred back through the gearbox 24 and is converted into electrical energy for storage in the battery 20.

During a regenerative braking event, the M/G may selectively apply a drag, or negative torque, to contribute to vehicle deceleration. Regenerative torque is more efficient when the torque converter bypass clutch 36 is locked. During a locked condition, the impeller and turbine are mechanically locked by the clutch. This locking eliminates slip between the parts thereby improving efficiency. Keeping the bypass clutch 36 locked as long as possible during deceleration allows the collection of more regenerative energy than would otherwise be possible with conventional torque converter scheduling. If during the deceleration, the torque converter clutch transitions from engaged to disengaged, there may be an abrupt change in the deceleration rate, causing roughness as perceived by the driver. Therefore such a transition may be performed gradually to enhance the smoothness of deceleration. Near the conclusion of a regenerative braking event as the vehicle slows to low speed or comes to a stop, the braking torque supplied by the M/G 18 must be transferred to the friction braking system to avoid a surge in torque when the bypass clutch 36 disengages. This transfer should be performed over a period of time to ensure smooth driving and driver satisfaction. According to the present disclosure, a regenerative torque "blend-out" may be coordinated with the torque converter bypass clutch disengaging.

In order to achieve precise timing needed to achieve coordination, disengagement of the torque converter bypass clutch may be anticipated, and the blend-out process may initiate in advance with a sufficient duration of time to achieve a smooth transition. Coordination of the regenerative torque with the deceleration needs of the vehicle may yield smoother vehicle operation. During the blend-out procedure, the controller may cause the regenerative torque to decay, and simultaneously increase the resistance of the friction brakes at a countervailing rate when the vehicle decelerates to low speeds.

Any condition which causes the torque converter bypass clutch 36 to disengage during regenerative braking may benefit from decaying the demanded regenerative torque in advance. One example of such a condition is a downshift in a gear ratio of the transmission. In low speed deceleration using regenerative braking, the vehicle transmission may shift from a second to first gear ratio. The torque converter may be configured to automatically open into an "overrun" mode when the transmission is shifted into first gear. Without an adjustment to the negative torque imparted by the motor, a rough deceleration may be perceived by the driver. A surge may be avoided by temporarily decaying the regenerative torque command in anticipation of disengagement of the bypass clutch 36.

It should be understood that the schematic illustrated in FIG. 1 is merely exemplary and is not intended to be limiting. Other configurations are contemplated that utilize selective engagement of both an engine and a motor to transmit through a transmission. For example, the M/G 18 may be offset from the crankshaft 30, and/or additional motor may be provided to start the engine 14. Other configurations are contemplated without deviating from the scope of the present disclosure.

Figure 2A:
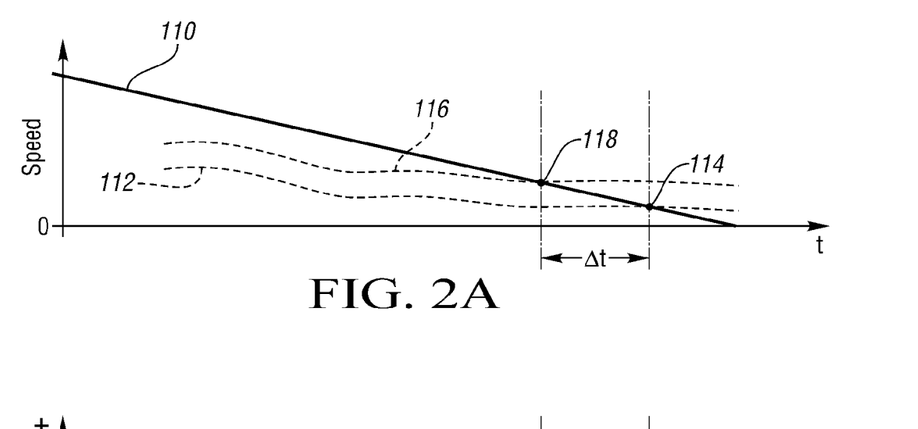
FIGS. 2A-2C are associated time plots of vehicle deceleration and regenerative braking characteristics.
Figure 2B:
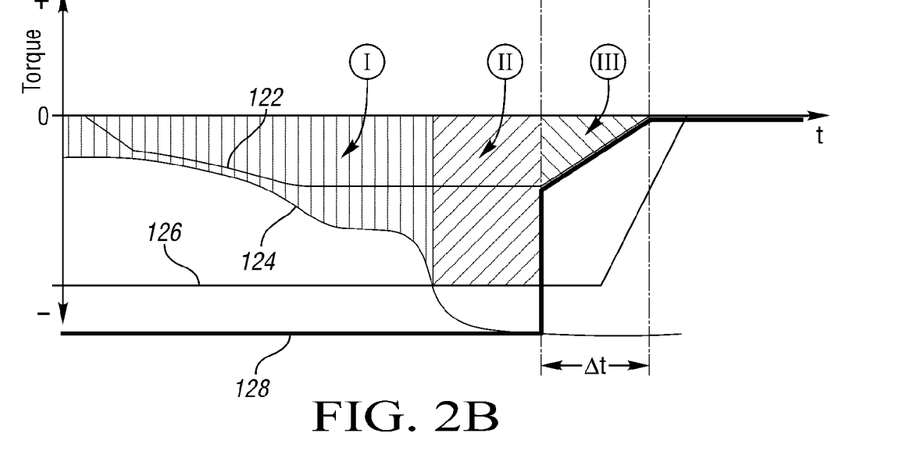
Figure 2C:
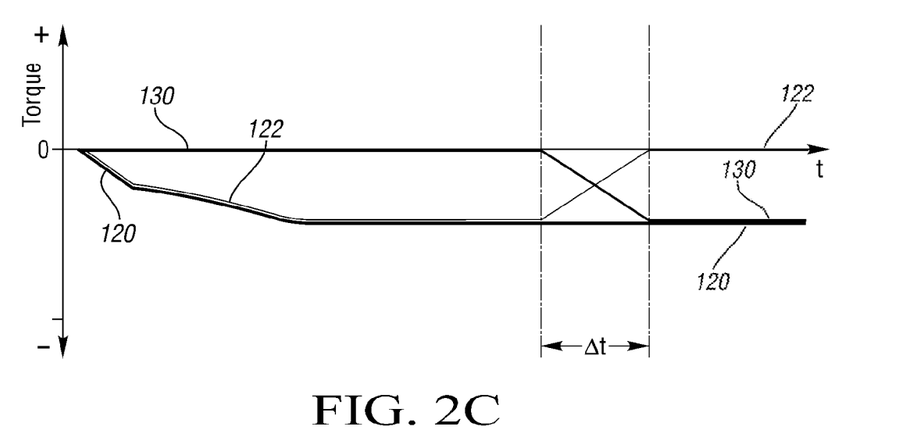

FIGS. 2A and 2B correspond in time, and are plots for powertrain operating parameters according to the present disclosure. FIG. 2A depicts vehicle speed versus time. By way of example, curve 110 represents a vehicle speed deceleration profile. Curve 112 represents a predetermined speed threshold where the torque converter bypass clutch disengages, and a torque bypass is activated thereby decoupling powertrain torque output from the differential. It should be noted that the value of the torque converter decouple speed threshold curve 112 may vary based on a number of operating conditions of the vehicle. For example the threshold may differ based on at least the transmission gear ratio, and/or rate of vehicle deceleration. When vehicle speed 110 decreases to less than the predetermined threshold 112 at point 114, the M/G may be decoupled from the vehicle wheels.

Still referring to FIG. 2A, a buffer threshold profile is provided as curve 116. The buffer threshold speed 116 is based on the speed threshold 112 which determines the opening of the torque converter. The buffer threshold speed 116 is greater than the speed threshold 112 by a predetermined amount such that the vehicle speed 110 crosses the buffer threshold 116 at point 118 at a duration Δt before crossing the speed threshold 112. Time duration Δt may vary depending on the rate of vehicle deceleration. It is further contemplated that the buffer profile may be varied based on vehicle deceleration rate such that time duration Δt between point 114 and point 118 remains relatively constant for higher and lower deceleration rates. Additionally, FIG. 2A depicts a profile of buffer speed threshold 116 where the difference between speed threshold 112 is a scalar value. However it is contemplated that the difference between the buffer threshold speed 116 and the speed threshold 112 may vary based on a number of vehicle operating parameters, including for example transmission gear ratio and vehicle deceleration rate. In at least one embodiment, the buffer threshold speed and the torque converter decouple speed threshold are predetermined and stored in a lookup table and retrievable by the controller for each of a range of vehicle conditions.

FIG. 2B depicts various aspects of vehicle torque related to the powertrain. Curve 120 represents driver braking demand profile, which may correspond to driver a brake pedal input. When the vehicle is in a regenerative braking mode, it may be beneficial to fuel economy to achieve as much braking as possible from the M/G to recover the maximum energy possible. Where possible the applied negative regenerative torque, represented by curve 122, fully satisfies driver braking demand 120. The amount of regenerative torque able to be applied may be limited by the physical capacity of the M/G. The amount of regenerative torque may vary based a number of vehicle operating conditions such as vehicle speed, transmission gear ratio, and state of charge of the battery. Curve 124 represents the powertrain regenerative torque limit, and the limit varies according to transmission gear ratio and/or vehicle speed.

Still referring to FIG. 2B, there may be additional limits imposed on the negative torque applied to decelerate the vehicle. Under certain conditions, too much applied negative torque at a given vehicle speed may cause instability and degrade vehicle handling and/or driver control. For this reason, a braking stability limit is applied to the negative torque, as represented by curve 126. The braking stability limit 126 may further serve to limit applied negative regenerative torque 122. The need for a stability torque limit generally diminishes as the vehicle speed approaches zero.

Further referring to FIG. 2B, a blend-out torque limit, represented by curve 128, is additionally applied to limit negative regenerative torque 122. As can be seen in the plot the blend-out torque limit 128 is set to a significant value at higher vehicle speeds so as not to limit applied negative regenerative torque 122. However, when vehicle speed is reduced to less than the buffer threshold 116, the blend-out torque limit operates to decay, or "blend-out" the applied negative regenerative torque 122 from an existing current regenerative torque value to zero over the time duration Δt. It should be appreciated that the disclosed technique of decaying the applied negative regenerative torque 122 is effective for a wide range of torques at the point of activation of the blend-out limit.

FIG. 2B depicts several regions, each of which reflects a different limiting factor for the applied negative regenerative torque 122. Region I represents a vehicle speed region where the capability of the M/G controls and the powertrain regenerative torque limit 124 dictates the maximum available regenerative braking torque. Once the vehicle decelerates and downshifts into lower gear ratios, the powertrain regenerative torque limit is increased. In region II the maximum allowable powertrain regenerative torque is dictated by the braking stability limit 126. Once the blend-out is activated in region III, the powertrain regenerative torque is dictated by the blend-out limit 128 and decayed to zero. Although driver brake request 120 is shown by way of example, the powertrain regenerative torque 122 may be larger in magnitude up to the respective limits of regions I, II, or III.

As opposed to an abrupt removal of regenerative torque related to the opening of the torque converter as discussed above, the negative regenerative torque is blended out and decayed over the period Δt such that substantially no negative regenerative torque is present when the torque converter opens. At the same time, negative torque from friction braking is increased to compensate for the decay and satisfy driver deceleration demand. By way of example, curve 130 represents negative torque applied by the friction brakes. At higher velocity, the powertrain regenerative torque 122 from the M/G satisfies driver braking request 120. When the powertrain regenerative torque 122 begins to decay in anticipation of the torque converter clutch opening, the friction brake torque 130 is ramped up such that the driver braking request 120 remains satisfied during the transition by the combination of both negative torques.

Figure 3:
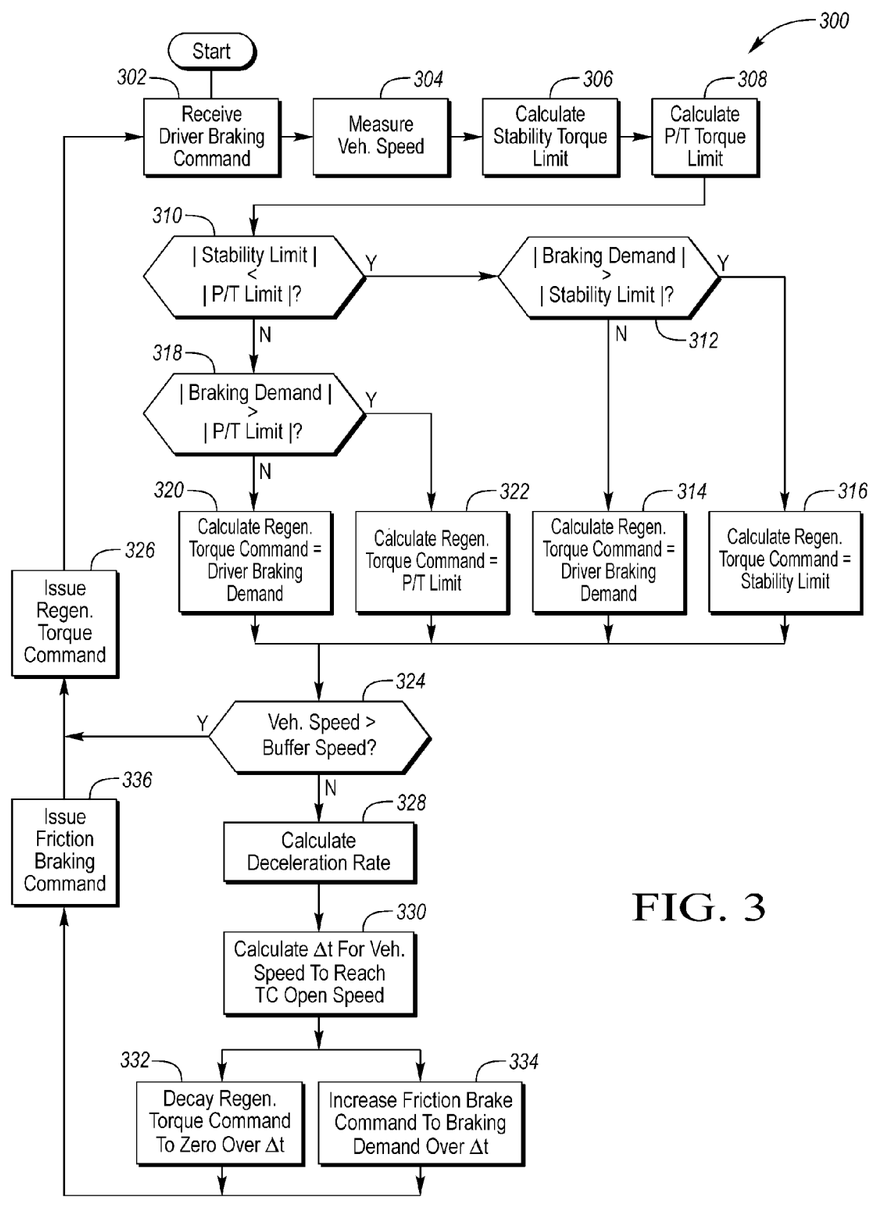
FIG. 3 is a flowchart corresponding to a method of the present disclosure.

FIG. 3 is a flow chart of a method 300 according to the present disclosure. At step 302, the controller receives a signal indicative of a driver input via a braking request, or braking demand. At step 304, the controller may receive a signal indicative of a vehicle speed measurement. Based upon the present speed the controller calculates at step 306 the maximum deceleration torque that may be applied and maintain acceptable vehicle stability. The controller may further determine at step 308, the maximum deceleration torque that is capable of being delivered by the powertrain for the given conditions. As discussed above this may depend, for example, on vehicle speed, battery state of charge, transmission gear ratio, as well as other conditions.

The controller may then determine which of the above deceleration torque limits will govern the maximum regenerative torque to be commanded from the M/G. At step 310 the controller may determine whether the stability torque limit or the regenerative braking capability of the powertrain will govern the braking command. If the stability torque limit is the limiting factor (the absolute value of the stability limit torque is less than the absolute value of the powertrain regenerative braking capability), at step 312 the driver braking demand is compared to the stability torque limit. If the driver braking demand is less than the stability limit, at step 314 the controller calculates a regenerative braking torque command corresponding to the full driver demand. If at step 312 the driver demand is greater than the stability braking limit, the controller calculates a command at step 316 such that the maximum regenerative torque to be applied by the powertrain corresponds to the stability limit of the vehicle, and not the full driver demand.

If at step 310 the regenerative braking capability of the powertrain is the limiting factor (the absolute value of the powertrain regenerative braking capability is less than the absolute value of the stability limit torque), the controller compares the driver braking demand with the powertrain torque limit at step 318. If the driver demand is less than the powertrain torque limit, at step 320 the controller calculates a regenerative braking torque command corresponding to the full driver braking demand. If the driver braking demand exceeds the powertrain torque limit the controller calculates at step 322 a command such that the regenerative braking torque to be applied by the powertrain corresponds to the powertrain limit, and not the full driver braking demand.

Once an appropriate braking command limit is determined by the controller at either of steps 314, 316, 320, or 322, the controller may determine if the torque converter bypass clutch will soon disengage. In at least one embodiment, this disengagement is triggered by a speed threshold. A predetermined buffer speed threshold is based upon the speed threshold at which the torque converter locking clutch will release. If at step 324 the vehicle speed is greater than the buffer speed, the controller will issue a regenerative torque command at step 326 corresponding to the calculated command from one of steps 314, 316, 320, or 322.

If at step 324 the vehicle speed is less than the buffer speed threshold, the controller will enter into a regenerative torque blend-out procedure. At step 328 the controller calculates the deceleration rate of the vehicle. The controller may calculate at step 330 the duration of time, considering the deceleration rate, before vehicle speed decreases such that the torque converter locking clutch disengages. Based on this duration of time, the controller calculates a decay of the regenerative torque command at step 332 so that the regenerative torque diminishes to approximately zero by the time the torque converter locking clutch disengages. At the same time, the controller calculates at step 334, an increase in frictional brake resistance over duration of time so that when the regenerative torque reaches zero, the friction brakes are ramped up to replace the regenerative torque and satisfy the driver braking demand.

At step 336 the controller issues a command such that the friction brakes apply resistance according to the calculation in the blend-out procedure. The controller correspondingly issues a command at step 326 based on the blend-out adjustment calculated at 332. After undergoing the blend-out procedure, decay may effectively adjust one of the regenerative torque commands calculated at one of steps 314, 316, 320, or 322. The controller then restarts method 300 by re-assessing whether there is a current drive braking demand.

The present disclosure provides representative control strategies and/or logic that may be implemented using one or more processing strategies such as event-driven, interrupt-driven, multi-tasking, multi-threading, and the like. As such, various steps or functions illustrated herein may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but it is provided for ease of illustration and description.

The control logic may be implemented primarily in software executed by a microprocessor-based vehicle, engine, and/or powertrain controller. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a powertrain having an electric machine;
   a torque converter in connection with the powertrain configured to decouple the electric machine from a vehicle axle in response to vehicle speed reducing to less than a second threshold;
   friction brakes configured to resist rotation of a wheel; and
   at least one controller programmed to (i) issue a command for the electric machine to apply a regenerative torque to decelerate the vehicle in response to driver braking demand, and (ii) cause both a decay in the regenerative torque and a countervailing increase in the resistance of the friction brakes when vehicle speed is reduced to less than a first threshold such that braking demand is substantially satisfied by only the friction brakes when the vehicle speed is less than the second threshold.

2. The vehicle of claim 1 wherein the regenerative torque is limited by at least one of a braking stability limit, a powertrain regenerative torque limit, and a blend-out limit, and the blend-out limit varies from a current regenerative torque value to approximately zero when the vehicle speed approaches the second threshold.

3. The vehicle of claim 1 wherein a difference in speed between the first and second thresholds varies based on a rate of vehicle deceleration.

4. The vehicle of claim 1 wherein a difference between the first and second thresholds is a constant.

5. The vehicle of claim 1 wherein the first and second thresholds vary based upon a transmission gear ratio.

6. The vehicle of claim 1 wherein a rate of the decay of the regenerative torque and a rate of the increase in resistance of the friction brakes each vary based on vehicle deceleration.

7. A method of controlling deceleration of a vehicle having an electric machine comprising:
   applying a regenerative torque from the electric machine to a powertrain torque output to satisfy a driver braking demand;
   decoupling the powertrain output torque from a vehicle axle when vehicle speed is reduced to less than a first predetermined threshold;
   decaying the regenerative torque such that a magnitude of the regenerative torque is approximately zero when the powertrain output torque is decoupled; and
   increasing a friction brake resistance at wheels of the vehicle such that driver braking demand is satisfied by only the friction brakes when the regenerative torque is approximately zero.

8. The method of claim 7 wherein the decaying of the regenerative torque occurs at a rate that is countervailing to a rate of increase of the friction brake resistance.

9. The method of claim 7 wherein decaying the regenerative torque is initiated in response to vehicle speed decreasing to less than a second buffer threshold that is greater than the first predetermined threshold.

10. The method of claim 9 further comprising modifying a difference between the second buffer threshold and the first predetermined threshold based on at least one of a transmission gear ratio and a deceleration rate.

11. A vehicle comprising:
    an electric machine configured to apply regenerative torque during a regenerative braking mode;
    a torque converter to decouple the electric machine from vehicle wheels;
    friction brakes to resist vehicle wheel rotation; and
    a controller programmed to transition out of regenerative braking mode prior to decoupling the electric machine, wherein regenerative torque and friction brake resistance collectively satisfy braking demand during the transition and, regenerative torque is approximately zero after the transition.

12. The vehicle of claim 11 wherein the torque converter includes an internal bypass clutch.

13. The vehicle of claim 11 wherein the decoupling of the electric machine from the wheels occurs in response to vehicle speed decreasing to less than a first predetermined threshold, and the controller initiates the transition out of regenerative braking mode in response to vehicle speed decreasing to less than a buffer threshold speed that is greater than the first predetermined threshold.

14. The vehicle of claim 13 wherein a difference between the buffer threshold speed and the first predetermined threshold varies based on at least one of a transmission gear ratio and a deceleration rate.

15. The vehicle of claim 13 wherein a difference between the buffer threshold speed and the first predetermined threshold is a scalar value.

16. The vehicle of claim 11 wherein the controller is further programmed to issue a command to increase the friction brake resistance at a rate that is countervailing to a decay in regenerative torque during the transition out of regenerative braking mode.

* * * * *